United States Patent
Salkintzis

(10) Patent No.: US 10,321,503 B2
(45) Date of Patent: Jun. 11, 2019

(54) METHOD AND APPARATUS FOR ATTACHING A REMOTE UNIT TO A MOBILE CORE NETWORK VIA A STANDALONE UNTRUSTED NON-3GPP ACCESS NETWORK

(71) Applicant: Motorola Mobility LLC, Chicago, IL (US)

(72) Inventor: Apostolis Salkintzis, Athens (GR)

(73) Assignee: Motorola Mobility LLC, Chicago, IL (US)

( * ) Notice: Subject to any disclaimer, the term of this patent is extended or adjusted under 35 U.S.C. 154(b) by 165 days.

(21) Appl. No.: 15/375,115

(22) Filed: Dec. 11, 2016

(65) Prior Publication Data
US 2018/0167983 A1    Jun. 14, 2018

(51) Int. Cl.
*H04W 8/22* (2009.01)
*H04W 12/08* (2009.01)
(Continued)

(52) U.S. Cl.
CPC ............. *H04W 76/15* (2018.02); *H04W 8/22* (2013.01); *H04W 76/11* (2018.02); *H04W 12/08* (2013.01); *H04W 76/10* (2018.02); *H04W 88/085* (2013.01)

(58) Field of Classification Search
CPC ....... H04W 76/15; H04W 76/11; H04W 8/22; H04W 76/10; H04W 12/08; H04W 88/085
See application file for complete search history.

(56) References Cited

U.S. PATENT DOCUMENTS

2013/0272190 A1* 10/2013 Du ..................... H04W 28/16
                                                370/315
2015/0172959 A1*  6/2015 Cucala Garcia ........ H04W 8/02
                                                455/436
(Continued)

OTHER PUBLICATIONS

3GPP TS 23.402 V14.1.0, 3rd Generation Partnership Project; Technical Specification Group Services and System Aspects; Architecture enhancements for non-3GPP accesses (Release 14), Sep. 2016, Valbonne, France.
3GPP TR 23.799 V1.2.1, 3rd Generation Partnership Project; Technical Specification Group Services and System Aspects; Study on Architecture for Next Generation System (Release 14), Nov. 2016, Valbonne, France.
(Continued)

*Primary Examiner* — Ivan O Latorre
(74) *Attorney, Agent, or Firm* — Loppnow & Chapa; Matthew C. Loppnow

(57) ABSTRACT

A method and apparatus attach a remote unit to a mobile core network via a standalone untrusted non-3GPP access network. A remote unit can be communicated with over a non-3GPP access network via a first network interface. A mobile core network can be communicated with via a second network interface and a third network interface. A secure connection request to establish a secure connection can be received via the first network interface. The secure connection with the remote unit can be established via the first network interface. Signaling data can be relayed between the secure connection and the second network interface when the secure connection request is associated with the first capability. A data connection can be established via the third network interface on behalf of the remote unit and user data can be relayed between the secure connection and the data connection when the secure connection request is associated with the second capability.

19 Claims, 6 Drawing Sheets

(51) Int. Cl.
*H04W 76/10* (2018.01)
*H04W 76/11* (2018.01)
*H04W 76/15* (2018.01)
*H04W 88/08* (2009.01)

(56) References Cited

U.S. PATENT DOCUMENTS

| | | | | |
|---|---|---|---|---|
| 2016/0182711 | A1* | 6/2016 | Xing | H04W 48/08 455/424 |
| 2017/0289046 | A1* | 10/2017 | Faccin | H04L 47/20 |
| 2017/0295529 | A1* | 10/2017 | Kang | H04L 63/0272 |
| 2017/0347302 | A1* | 11/2017 | Li | H04W 16/04 |
| 2017/0366399 | A1* | 12/2017 | Li | H04W 12/06 |
| 2018/0103363 | A1* | 4/2018 | Faccin | H04L 12/66 |
| 2018/0220302 | A1* | 8/2018 | Chen | H04W 48/06 |
| 2018/0295570 | A1* | 10/2018 | Olsson | H04W 48/12 |

OTHER PUBLICATIONS

Reitsma-Papageorgiou, PCT International Search Report, International application No. PCT/US2017/064570, European Patent Office, Rijswijk, NL, dated Feb. 28, 2018.

QUALCOMM Inc et al: "Further agreements on support on non-3GPP access", 3GPP DRAFT; S2-166543-NEXTGEN NON-3GPPV2, 3RD Generation Partnership Project (3GPP), Mobile Competence Centre, 650, Route Des Lucio Les, F-06921 Sophia-Antipolis Cedex, France, vol. SA WG2, no. Reno, NV Nov. 14, 2016.

QUALCOMM Inc et al: "Way forward on support of non-3GPP access and update to solution 8.6 for support of untrusted non-3GPP access", 3GPP DRAFT; S2-166283-WAS-S2-166254-WAS-S2-166129-WASS2-I65767-NEXTGEN UN3GPP REV-SOl, 3RD Generation Partnership Project (3GPP), Mobile Competence Centre; 650, Route Des Lucioles ; F-06921 Sophia-A, vol. SA WG2, no. Kaohsiung city, Taiwan; 20161017-20161021, Oct. 24, 2016.

\* cited by examiner

METHOD AND APPARATUS FOR ATTACHING A REMOTE UNIT TO A MOBILE CORE NETWORK VIA A STANDALONE UNTRUSTED NON-3GPP ACCESS NETWORK

BACKGROUND

1. Field

The present disclosure is directed to wireless communications. More particularly, the present disclosure is directed to a method and apparatus for attaching a remote unit to a mobile core network via a standalone untrusted non-3GPP access network.

2. Introduction

Presently, remote units, such as smartphones, personal computers, tablet computers, connected home devices, smart televisions, set-top boxes communicate with mobile communication networks to send and receive data. Mobile communication networks following the Long Term Evolution (LTE) architecture support several different interfaces between an Access Network (AN) and an Evolved Packet Core (EPC) with different types of access networks use different types of interfaces. For example, the S1 interface is used only between an Evolved Universal Terrestrial Radio Access (E-UTRAN) and EPC. As another example, wireless local area network (WLAN) access to the EPC involves several other interfaces, such as the S2a and STa interfaces for access via trusted WLANs, the SWu and S2b interfaces for access via untrusted WLANs, and the S2c interface for access via either trusted or untrusted WLANs. In addition, new network elements have been specified for WLAN interworking, including the Authentication, Authorization, and Accounting (AAA) server, the Evolved Packet Data Gateway (ePDG), the Trusted Wireless Access Gateway (TWAG), and other network elements. All these different interfaces and network elements for connecting different accesses to EPC have resulted in a complex and difficult to manage architecture.

At times, a WLAN access network is integrated into the E-UTRAN in a way that requires neither new network elements in EPC nor new AN-EPC interfaces, such as by using LTE-WLAN Aggregation (LWA). However, this kind of WLAN integration has limited deployment scenarios because the WLAN access network must always be within the LTE coverage and, more importantly, the WLAN access network needs to be a special WLAN that supports an interface with a mobile communication network base station (eNB) and requires several other enhancements. Such a WLAN access network is not a standalone WLAN because it requires the presence and integration with E-UTRAN. To support interworking with standalone WLAN accesses, which account for a majority of deployment scenarios, additional, WLAN-specific network elements and interfaces are required, which increase the complexity of the system. For example, remote units can access a Next Generation (NextGen) Core Network (NGCN), such as a 5G network, over a non-Third Generation Partnership Project (non-3GPP) access network, such as a WLAN access network. To access the NGCN, a remote unit must use a specific protocol, such as a Non-Access Stratum (NAS) protocol.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope. The drawings may have been simplified for clarity and are not necessarily drawn to scale.

DETAILED DESCRIPTION

Figure 1:
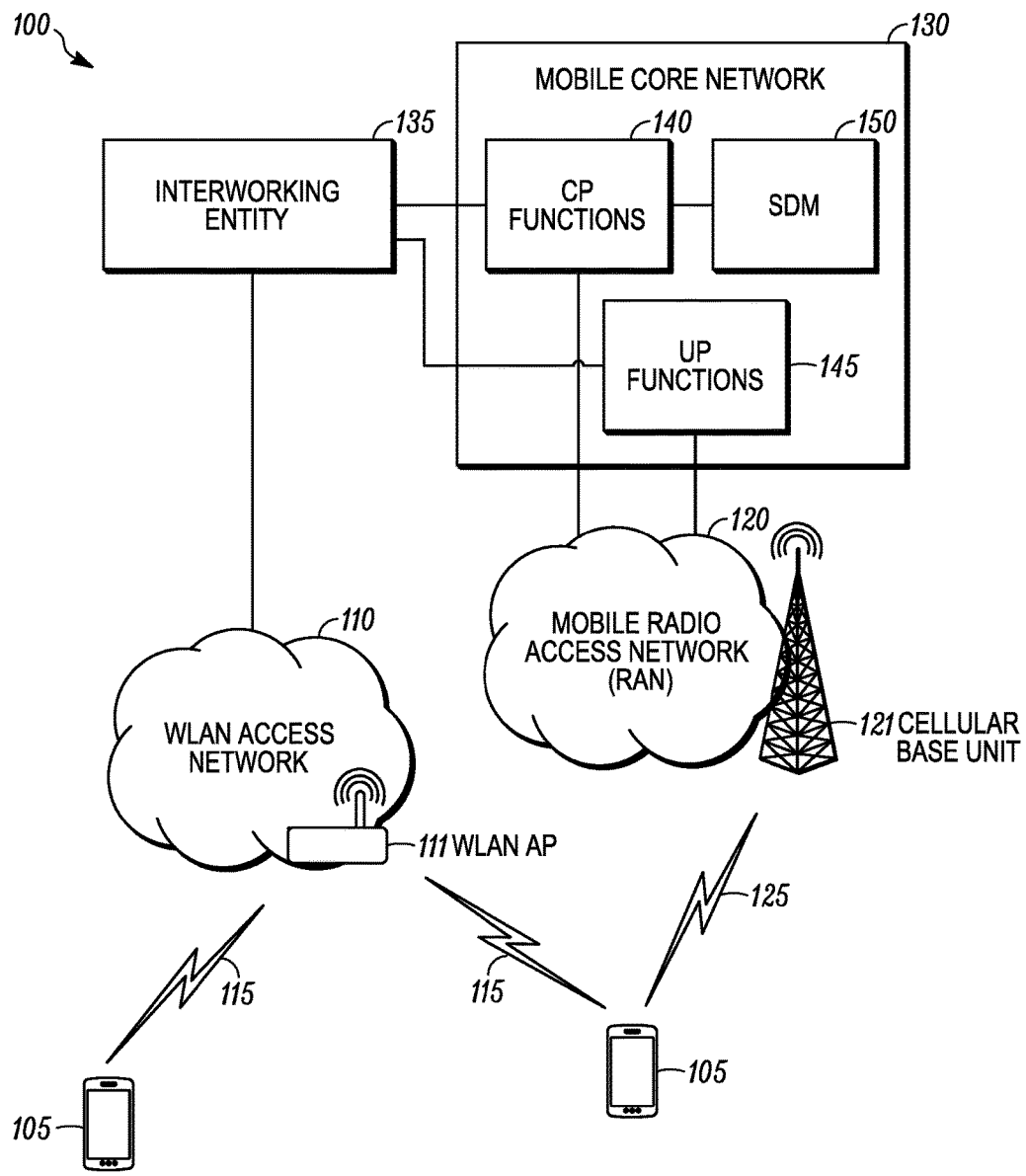
FIG. 1 is an example illustration of a system according to a possible embodiment.

Embodiments provide a method and apparatus for attaching a remote unit to a mobile core network via a standalone untrusted non-3GPP access network. According to a possible embodiment, a remote unit can be communicated with over a non-3GPP access network via a first network interface. A mobile core network can be communicated with via a second network interface and a third network interface. A secure connection request to establish a secure connection can be received via the first network interface. The secure connection request can be determined to be associated with a first capability or a second capability. The secure connection with the remote unit can be established via the first network interface. Signaling data can be relayed between the secure connection and the second network interface when the secure connection request is associated with the first capability. A data connection can be established via the third network interface on behalf of the remote unit and user data can be relayed between the secure connection and the data connection when the secure connection request is associated with the second capability.

According to possible embodiments, future wireless standards are expected to simplify architecture and to specify a common Access Network-Core Network (AN-CN) interface that can be used for all types of access networks, also referred to as ANs, including 3GPP ANs such as 5G Radio Access Networks (RANs) and non-3GPP ANs such as Wireless Local Area Networks (WLAN), fixed broadband networks, satellite access networks, and other access networks. All types of access networks, both 3GPP and non-3GPP, can communicate with the CN using the same AN-CN interfaces. For example, a common control plane interface, such as an NG2 interface, and a common user plane interface, such as an NG3 interface, can be used as AN-CN interfaces.

A Non-3GPP Interworking Function (N3IWF) can be used to provide interworking between the non-3GPP access networks (N3AN) and the CN. The N3IWF can contain both hardware and software elements for protocol conversion and signal adaptation between the N3AN and the CN. Additionally, the N3IWF can execute a 3GPP attach procedure with the CN on behalf of a User Equipment (UE), such as a remote unit, when the UE connects to a N3AN and carries out an authentication procedure. For example, when a UE associates with a trusted WLAN and begins an Extensible Authentication Protocol-Authentication and Key Agreement (EAP-AKA), such as EAP-AKA', authentication procedure, the N3IWF can initiate a 5G attach procedure with the CN on behalf of the UE. The N3IWF can act as a proxy for the UE while the UE continues the EAP-AKA' authentication procedure.

The N3IWF can include a functional component referred to as an attach proxy, which can perform interworking between the authentication signaling and the 3GPP attach signaling. In doing so, the attach proxy can act as a UE proxy and can initiate the 3GPP attach procedure on behalf of the UE. The attach proxy can take parameters received from the UE in an authentication procedure message and generate an attach procedure message for the CN using the received parameters. Similarly, the attach proxy can take parameters received from the CN in an attach procedure message and can generate an authentication procedure message for the UE using the parsed parameters.

Legacy UEs can be authenticated and authorized by the 5G CN when they attach to a trusted WLAN, such as by using EAP-AKA' authentication. In this way, legacy UEs can connect to a trusted WLAN and start Non-Seamless WLAN Offload (NSWO) traffic, such as traffic that traverses only the WLAN instead of the 5G core network, without requiring new UE capabilities. Similarly, legacy UEs can be authenticated and authorized by the 5G CN when they establish an Internet Key Exchange (IKE) Internet Protocol Security (IPsec), such as an IKEv2/IPsec, connection to the N3IWF, which can be perceived as an evolved Packet Data Gateway (ePDG).

In the context of Next Generation (NextGen) work in the 3GPP System and Services Aspects—Architecture group (SA2), it has been agreed that UEs can attach to NextGen core network (NGCN) over non-3GPP access, such as over a WLAN, by using a Non-Access Stratum (NAS) protocol. The agreement for UEs to utilize the NAS signaling was motivated by the need to have a common AN-CN interface that is used for both 3GPP and non-3GPP accesses.

Although it is reasonable to assume that NextGen smartphones should support NAS signaling over non-3GPP access because they support NAS over 3GPP access anyway, it is not very reasonable to assume that devices that support non-3GPP access only, such as WLAN-only devices, should implement the NAS protocols in order to connect to NGCN. In particular, the NextGen system should be accessible by many WLAN-only devices, such as to enable a vast range of deployment scenarios and business cases. However, if all of these devices must support the NAS protocols over WLAN, then the devices that can access NextGen are considerably limited and Internet-of-Things (IoT) scenarios that can be supported are limited. For example, most IoT devices, such as everyday objects that have network connectivity, at present feature WLAN connectivity but none utilize the NAS protocols over WLAN. Ideally, all of these existing IoT devices should be capable of accessing the NextGen core without any implementation changes. Requiring all them to support the NAS protocols essentially excludes all of them from accessing the NextGen system. According to some embodiments, existing non-3GPP access network-only devices, such as WLAN-only devices can be allowed to access the NGCN without major changes or with no changes, such as without changing the non-3GPP access network-only device to use NAS protocols.

FIG. 1 is an example illustration of a system 100 according to a possible embodiment. In one embodiment, the system 100 includes remote units 105, at least one WLAN AN 110, WLAN communication links 115, a mobile RAN 120, and cellular communication links 125. Each WLAN AN 110 can include one or more WLAN access points (APs) 111. In one example, the mobile RAN 120 can be a 5G RAN defined by 3GPP. The mobile RAN 120 can include one or more cellular base units 121. An interworking entity 135, such as an entity that provides an N3IWF, can be contained within, such as co-sited with, the WLAN 110, can be located in the mobile RAN 120, can be located in the mobile core network 130, can be a component of a WLAN AP 111, and/or can be located anywhere else to provide interworking functions. Even though a specific number of remote units 105, WLAN ANs 110, WLAN APs 111, WLAN communication links 115, mobile RANs 120, cellular base units 121, and cellular communication links 125 are depicted, any number of remote units 105, WLAN ANs 110, WLAN APs 111, WLAN communication links 115, mobile RANs 120, cellular base units 121, and cellular communication links 125 may be included in the system 100. The system 100 can attach a remote unit 105 to the mobile core network 130 via an untrusted non-3GPP access network, such as the WLAN AN 110, by using an interworking entity 135.

In one implementation, the system 100 can be compliant with a fifth generation (5G) of the 3GPP mobile network and implement the relevant 5G protocols. More generally, however, the system 100 can implement some other open or proprietary communication protocol, such as WiMAX, and/or other protocols.

According to a possible embodiment, the remote units 105 can be computing devices, such as desktop computers, laptop computers, personal digital assistants, tablet computers, smart phones, smart televisions, such as televisions connected to the Internet, smart appliances, such as appliances connected to the Internet, set-top boxes, game consoles, security systems, security cameras, vehicle on-board computers, network devices, such as routers, switches, and/or modems, wearable devices, such as smart watches, fitness bands, optical head-mounted displays, IoT devices, or other devices that can connect to a network. Moreover, the remote units 105 may be referred to as User Equipment (UE) subscriber units, mobiles, mobile stations, users, terminals, mobile terminals, fixed terminals, subscriber stations, user terminals, devices, or any other devices that can connect to a network. The remote units 105 can communicate directly with one or more of the WLAN APs 111 via uplink UL and downlink DL communication signals. The UL and DL communication signals can be carried over the WLAN communication links 115. Similarly, the remote units 105 can communicate with one or more cellular base units 121 in a mobile Radio Access Network (mobile RAN) 120 via UL and DL communication signals carried over the cellular communication links 125.

The WLAN ANs 110 can be distributed over a geographic region. A WLAN AN 110 can connect to the mobile core network 130 via the interworking entity 135. According to a possible embodiment, a WLAN AN 110 can be controlled by an operator of the mobile core network 130 and the WLAN AN 110 can have direct access to the mobile core network 130. Such a WLAN deployment can be referred to as a trusted WLAN. A WLAN AN 110 is considered trusted when it is operated by the 3GPP mobile core network operator and supports certain security features, such as 3GPP-based authentication and strong air-interface encryption.

According to another possible embodiment, a WLAN AN 110 may not be controlled by the operator of the mobile core network 130 and may not have direct access to the mobile core network 130. Such a WLAN deployment can be referred to as an untrusted WLAN. Examples of untrusted WLANs can include public hotspots deployed in malls, coffee shops, and other public areas, can include unregistered home WLANs, and can include other untrusted WLANs. Untrusted WLAN ANs 110 can rely on a data network, such as the Internet, to connect to the mobile core network 130. The mobile core network 130 can provide services to a remote unit 105 via the WLAN AN 110.

Each WLAN AP 111 can serve a number of remote units 105 within a serving area. The WLAN APs 111 can communicate directly with one or more remote units 105 by receiving UL communication signals and transmitting DL communication signals to serve the remote units 105 in the time, frequency, and/or spatial domain. Both DL and UL communication signals can be carried over the WLAN communication links 115. The communication links 115 can be in the unlicensed radio spectrum.

The cellular base units 121 in the mobile RAN 120 can be distributed over a geographic region. A cellular base unit 121 can also be referred to as an access terminal, a base, a base station, a Node-B, an eNB, a gNB, a Home Node-B, a relay node, a device, or any other cellular base unit. The cellular base units 121 can be part of the mobile RAN 120.

The mobile RAN 120 can serve a number of remote units 105 within a serving area, such as a cell or a cell sector, of the cellular base unit 121 via a wireless communication link 125. The mobile RAN 120 can communicate directly with one or more of the remote units 105 using communication signals. Generally, the mobile RAN 120 can transmit DL communication signals to serve the remote units 105 in the time, frequency, and/or spatial domain. Furthermore, the DL communication signals can be carried over the cellular communication links 125. The cellular communication links 125 can be any suitable carrier in licensed or unlicensed radio spectrum. The cellular communication links 125 can communicate with one or more of the remote units 105 and/or one or more of the cellular base units 121 in the mobile RAN 120.

The mobile core network 130 can be a 5G packet core network that can be coupled to other networks, such as the Internet, private data networks, and/or other data networks. Additionally, the mobile core network 130 can be coupled to other types of access networks, such as fixed broadband access networks, satellite access networks, and other types of access networks.

A mobile core network 130 can belong to a single Public Land Mobile Network (PLMN). The mobile core network 130 can include at least one Control Plane (CP) function 140. While the mobile core network 130 may include a plurality of CP functions, the disclosed procedures may only require the involvement of one CP function, such as one network entity, from a plurality of CP functions. The mobile core network 130 can also include at least one User Plane (UP) function 145. The mobile core network 130 can further include Subscriber Data Management (SDM) 150 that can be associated with the Home Subscriber Server (HSS) in Evolved Packet Core (EPC).

The CP functions 140 can include network control functions that govern access to services of the mobile core network 130. Examples of CP functions can include a mobility management function, a policy function, a session management function, an authentication function, and/or other network control functions. The UP function 145 can enable delivery of data and other services to a subscriber, such as a remote unit 105. The SDM 150 can be a central database that contains user-related and subscription-related information.

In next-generation, such as 5G, 3GPP mobile core networks 130, both the mobile RAN 120 and the WLAN AN 110, or any other non-3GPP access network, can communicate with the core network using a common control plane interface, such as an NG2 interface, and a common user plane interface, such as an NG3 interface. The interworking entity 135 can provide interworking between a WLAN AN 110 and the mobile core network 130, by converting non-3GPP access network protocols to messages sent over the NG2 and NG3 interfaces.

To expedite a remote unit 105 receiving services from the mobile core network 130, the interworking entity 135 can send a 3GPP attach request to the mobile core network 130 on behalf of the remote unit 105 when the remote unit 105 connects to a WLAN AN 110 and carries out an authentication procedure with the interworking entity 135. Here, the interworking entity 135 may perform Authentication, Authorization, and Accounting (AAA) functions for the WLAN AN 110 and can convert 3GPP authentication messages used by the mobile core network 130 into authentication messages used by the WLAN AN 110.

Figure 2:
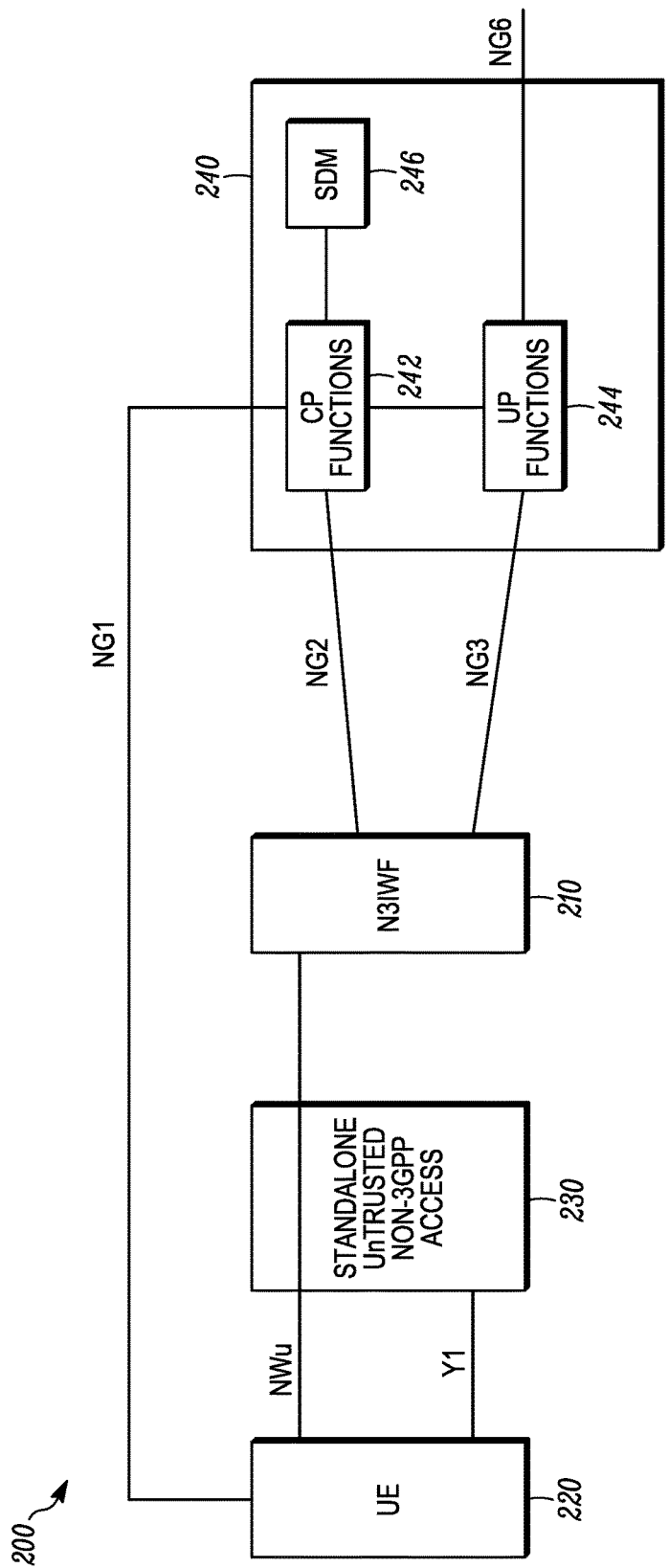
FIG. 2 is an example illustration of a system according to a possible embodiment.

FIG. 2 is an example illustration of a system 200 according to a possible embodiment. The system 200 can include an N3IWF 210, such as the interworking entity 135, a UE 220, such as a remote unit 105, a standalone untrusted non-3GPP access network 230, such as the WLAN AN 110, and a mobile core network 240, such as the mobile core network 130, including CP functions 242, UP functions 244, and an SDM 246. As discussed above, the CP/UP Functions can be Control-Plane/User-Plane functions, respectively, in a NextGen core network. The NG2/NG3 interfaces, also be called NGc/NGu, can denote Access Network-Core Network (AN-CN) CP and UP interfaces respectively. The UE 220 can exchange NAS signaling with the CP functions 242 via the NG1 interface. The NG6, which can be the equivalent of SGi in EPC, can be an interface that connects to external data networks. An IPsec tunnel can be established over the NWu interface between the UE 220 and N3IWF 210 to protect the CP/UP traffic when the UE 220 is connected to the untrusted non-3GPP network 230. The functionality of N3IWF 210 can have some similarities with the ePDG in EPC. The Y1 interface depends on the type of untrusted non-3GPP access. In case of an untrusted WLAN access, the Y1 interface can be based on IEEE 802.11 protocols and can be the WLAN radio interface between the UE 220 and a WLAN access network, such as the untrusted non-3GPP access network 230.

Figure 3:
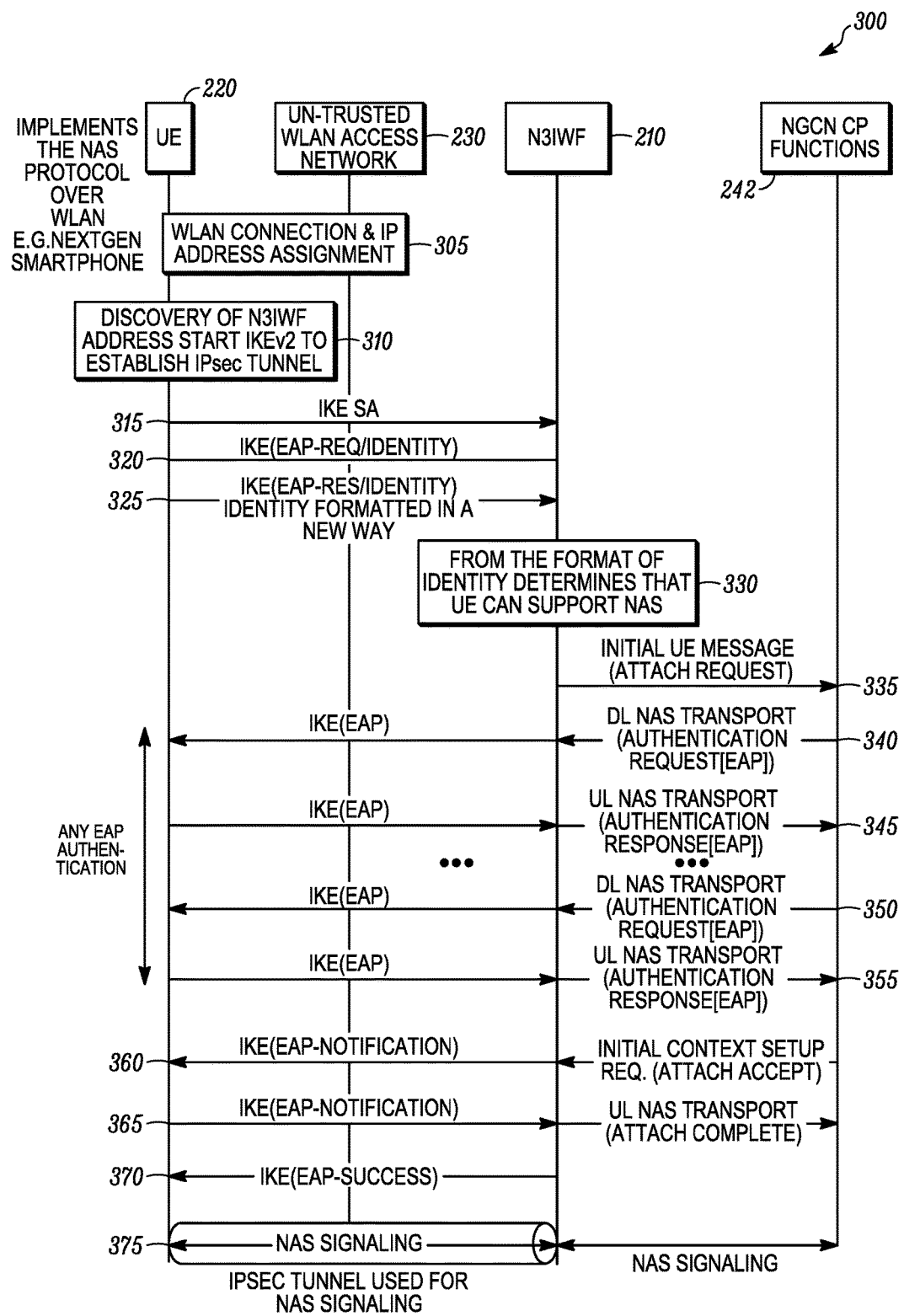
FIG. 3 is an example signaling flow diagram according to a possible embodiment.

FIG. 3 is an example signaling flow diagram 300 according to a possible embodiment. The signaling flow diagram 300 can show signals between the UE 220, the untrusted WLAN access network 230, the N3IWF 210, and the NGCN CP functions 242, such as at the mobile core network 240. The signaling flow diagram 300 can illustrate a method by which the UE 220, such as a remote unit, like a 5G smartphone or other remote unit, that supports the NAS protocol can be attached to an NGCN, such as the mobile core network 240, over an untrusted WLAN access network 230.

At 305, the UE can connect to the untrusted WLAN access network 230 and be assigned an Internet Protocol (IP) address. For example, the UE 220 first can connect to an untrusted non-3GPP network. An untrusted network, such as an untrusted WLAN or public hotspot, can be considered untrusted when it is not managed by a 3GPP operator or by a trusted partner of the 3GPP operator.

At 310, the UE 220 can then discover the IP address of N3IWF 210 in a specific PLMN and start IKEv2 to establish an IPsec tunnel. The discovery of the IP address can be similar or even identical to ePDG discovery specified in 3GPP TS 23.402.

At 315, when the UE 220 wants to attach to an NGCN over the untrusted WLAN 230, the UE 220 can start the normal IKEv2 signaling and establish an IKE Security Association (IKE SA). Subsequently, the UE 220 can start the establishment of an IPsec tunnel (also referred to as IPsec SA). During this IPsec tunnel establishment, the UE 220 and the NGCN can be mutually authenticated with an EAP-based authentication method, such as EAP-AKA', if Universal Subscriber Identity Module (USIM) credentials are used, or any other method supported by NGCN, such as EAP-Transport Layer Security (EAP-TLS), EAP-Tunneled Transport Layer Security (EAP-TTLS) Tunneled Transport Layer Security, and/or other authentication methods.

For example, at 320, the N3IWF 210 can send an IKE (EAP-Req/Identity) identity request message to the UE 220. At 325, the UE 220 can send an IKE(EAP-Res/Identity) identity response message. The UE identity in the identity response message can be formatted in a new way. For example, the identity presented by the UE 220 as part of an EAP authentication procedure can be normally formatted according to a legacy format as a Network Access Identifier (NAI), such as 0<IMSI>@nai.epc.mnc<MNC>.mcc<MCC>0.3 gppnetwork.org This can be based on the format of the identity presented by existing UEs when they attempt to establish an IPsec to an ePDG located at their home PLMN. The '0' before IMSI can be a hint that indicates preference to use EAP-AKA authentication. According to a different implementation, the UE 220 can present a first capability identity format that is formatted in a new different way, such as 0<IMSI>.nas@nai.epc.mnc<MNC>.mcc<MCC>0.3 gppnetwork.org In this example, the username presented by the UE is 0<IMSI>.nas, which is compliant with RFC7542 which defines the username as string *("." string). Note that the ".nas" suffix can be added as part of the username. This first capability identity format can indicate to the N3IWF 210 that the UE 220 has a first capability. For example, the identity format can indicate to the N3IWF that the UE 220 is not a legacy remote unit but it is a new UE that supports NAS signaling over a non-3GPP, such as a WLAN, access network.

Otherwise, the identity presented by the UE 220 can be in a second capability identity format, which can be an NAI identity that is normally formatted according to the legacy format. This second capability identity format can indicate to the N3IWF 210 that the UE 220 has a second capability. For example, this second capability identity format can indicate to the N3IWF 210 that the UE 220 does not support NAS over non-3GPP access.

According to another possible implementation, as an alternate to, or in addition to the new identity format, the identity response message can include an identity of the UE 220 and a capability information element. The capability information element can indicate to the N3IWF 210 whether or not the UE 220 has a first capability, such as a capability that supports NAS, or a second capability, such as a capability that does not support NAS. Thus, instead of using a different format for the UE identity, the UE 220 can add a new information element in the EAP-Response/Identity message which can indicate to N3IWF 210 that the UE 220 supports the NAS protocol.

At 330, the N3IWF 210 can determine that the UE 220 can support NAS from the format of the identity, from a capability information element, or from any other way of determining the UE 220 can support NAS.

Subsequently, at 335 the N3IWF 210 can send an initial UE message, such as an attach request, to the NGCN CP functions 242 on behalf of the UE 220. This can initiate a normal attach procedure over NG2. During the attach procedure, the UE 220 can be authenticated. For example, at 340 the NGCN CP functions can send a DL NAS transport message including an EAP authentication request, which the N3IWF 210 can forward to the UE 220 using IKE(EAP). At 345, the N3IWF 210 can send an UL NAS transport message including an EAP authentication response from the UE 220 to the NGCN CP functions 242. According to the illustrated possible implementation, there can be multiple NAS transport authentication requests 350 and authentication responses 355 between N3IWF 210 and the NGCN CP functions 242 because some authentication methods, such as EAP-TTLS, can require multiple round-trips, such as multiple requests/responses, between a client and a server. According to another possible implementation, other authentication methods, such as EAP-AKA, can require only one round-trip.

At 360, the N3IWF 210 can receive an initial context setup request including an attach acceptance from the NGCN CP functions 242 and can send to UE 220 one or more parameters included in the attach acceptance (e.g. a new UE temporary identity) by using an IKE(EAP-Notification). At 365, the N3IWF 210 can receive an IKE(EAP-Notification) response from the UE 220 and can send an UL NAS transport message indicating attach completion to the NGCN CP functions 242. At 370, the N3IWF 210 can send an IKE(EAP-Success) message to the UE 220, which completes the successful IPsec tunnel establishment. At 375, the IPsec tunnel between the UE 220 and the N3IWF 210 is established and can be used to transfer NAS signaling messages between the UE 220 and the NGCN CP Functions 242. These messages are relayed by N3IWF 210 between the IPsec tunnel and the NG2 interface. For example, the UE can send a NAS message over the IPsec tunnel to request a Protocol Data Unit (PDU) data session setup for connecting with an external data network, such as the Internet, another NGCN, or other external data network to transmit and receive data with the external data network.

In an alternative implementation, when the N3IWF 210 receives the Attach Accept in step 360, it may not send an IKE(EAP-Notification) to UE 220. Instead, it can send the IKE(EAP-Success) to the UE 220, which completes the establishment of the IPsec tunnel and then forward the Attach Accept message to the UE 220 via the established IPsec tunnel. Since the UE 220 does support NAS signaling, it will be able to process this Attach Accept message and send an Attach Complete response via the IPsec tunnel.

Figure 4:
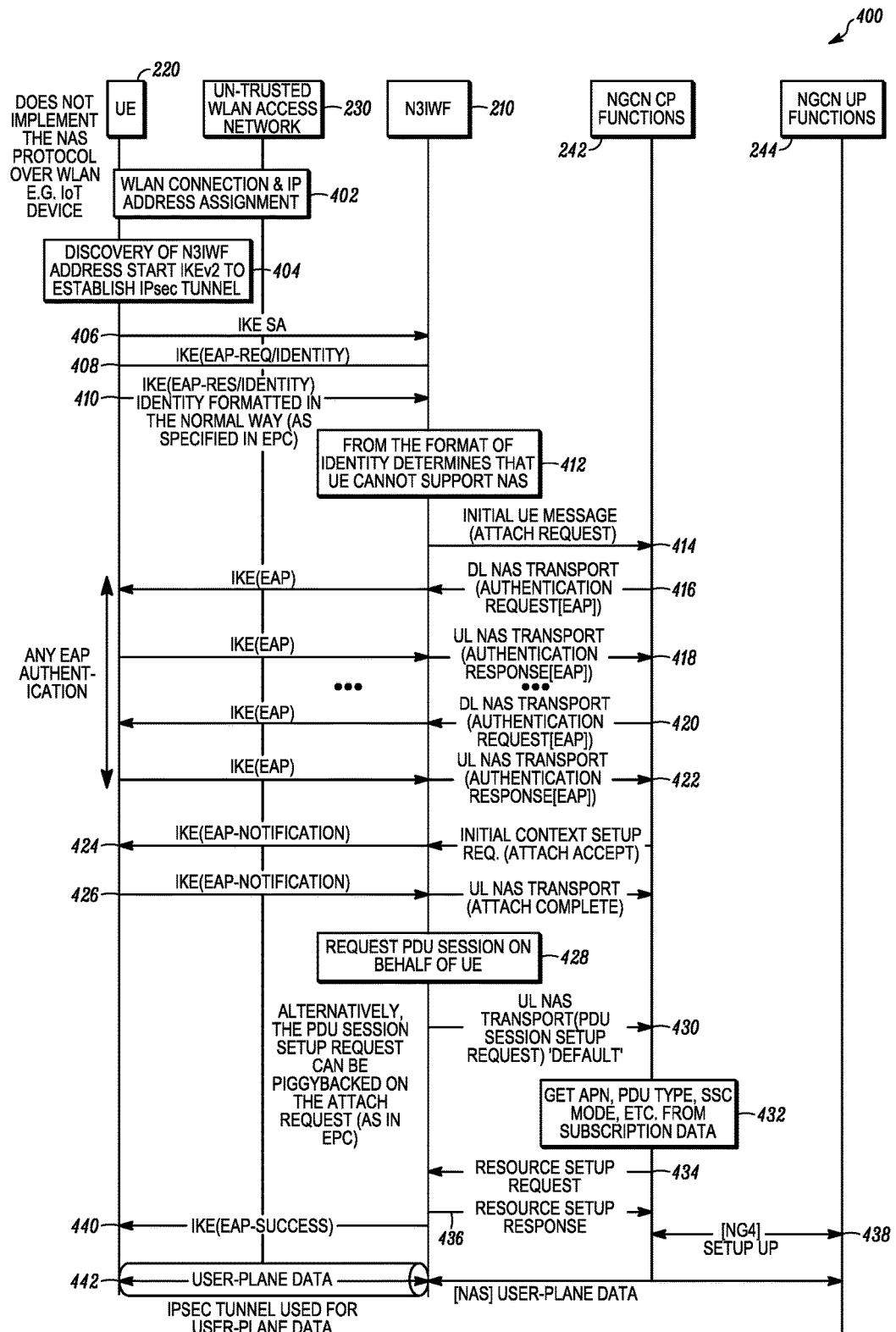
FIG. 4 is an example signaling flow diagram according to a possible embodiment.

FIG. 4 is an example signaling flow diagram 400 according to a possible embodiment. The signaling flow diagram 400 can show signaling messages between the UE 220, the untrusted WLAN access network 230, the N3IWF 210, NGCN CP functions 242, and NGCN UP functions 244 of the mobile core network 240. The signaling flow diagram 400 can illustrate a method by which the UE 220, such as a remote unit, like a WLAN-only device, an IoT device or other remote unit, that does not support the NAS protocol over non-3GPP access, can attach to the NGCN.

At 402, the UE can connect to the untrusted WLAN access network 230 and be assigned an Internet Protocol (IP) address. For example, the UE 220 first can connect to an untrusted non-3GPP network. At 404, the UE 220 can discover the IP address of N3IWF 210 in a specific PLMN and start IKEv2 to establish an IPsec tunnel. The discovery of the IP address can be similar or even identical to the ePDG discovery specified in TS 23.402.

At 406, when the UE 220 wants to attach to an NGCN over the untrusted WLAN 230, the UE 220 can start the normal IKEv2 signaling and establish an IKE SA. Subsequently, the UE 220 can start the establishment of an IPsec tunnel, which can also be referred to as IPsec SA. At 408, the N3IWF 210 can send an IKE(EAP-Req/Identity) identity request message to the UE 220. At 410, the UE 220 can send an IKE(EAP-Res/Identity) identity response message. The identity response message can be formatted in a normal way, such as a legacy way specified in EPC. According to a possible implementation, as discussed above, the identity presented by the UE 220 as part of an EAP authentication procedure can be normally formatted according to a legacy format as a Network Access Identifier (NAI), such as 0<IMSI>@nai.epc.mnc<MNC>.mcc<MCC>0.3 gppnetwork.org This can be based on the format of the identity presented by existing UEs when they attempt to establish an IPsec to an ePDG located at their home PLMN. The '0' before IMSI can be a hint that indicates preference to use EAP-AKA authentication. For example, the identity presented by the UE 220 can be a in a second capability identity format, which can be an NAI identity that is normally formatted according to the legacy format. This second capability identity format can indicate to the N3IWF 210 that the UE 220 has a second capability. For example, this second capability identity format can indicate to the N3IWF 210 that the UE 220 does not support NAS over non-3GPP access.

According to another possible implementation, the identity response message can include an identity of the UE 220 and a capability information element. The capability information element can indicate to the N3IWF 210 whether or not the UE 220 has a first capability, such as a capability that supports NAS, or a second capability, such as a capability that does not support NAS. Thus, instead of using a different format for the UE identity, the UE 220 can add a new information element in the EAP-Response/Identity message which can indicate to N3IWF 210 whether or not the UE 220 supports the NAS protocol. As an alternate implementation, the lack of the capability information element can indicate the UE 220 does not support the NAS protocol.

At 412, the N3IWF 210 can determine that the UE 220 does not support NAS from the format of the identity, from a capability information element, or from any other way of determining the UE 220 does not support NAS.

At 414, the N3IWF 210 can send an initial UE message, such as an attach request, to the NGCN CP functions 242 on behalf of the UE 220. This can initiate a normal attach procedure over NG2. During the attach procedure, the UE 220 can be authenticated. For example, at 416 the NGCN CP function can send a DL NAS transport message including an EAP authentication request, which the N3IWF 210 can forward to the UE 220 using IKE(EAP). At 418, the N3IWF 210 can send an UL NAS transport message including an EAP authentication response from the UE 220 to the NGCN CP functions 242. According to the illustrated possible implementation, there can be multiple NAS transport authentication requests 420 and authentication responses 422 between N3IWF 210 and the NGCN CP Functions 242 because some authentication methods, such as EAP-TTLS, can require multiple round-trips, such as multiple requests/responses, between the client and the server. According to another possible implementation, other authentication methods, such as EAP-AKA, can require only one round-trip. At 424, the N3IWF 210 can receive an initial context setup request including an attach acceptance from the NGCN CP functions 242 and can send to UE 220 one or more parameters, such as a new UE temporary identity, included in the attach acceptance by using an IKE(EAP-Notification). At 426, the N3IWF 210 can receive an IKE(EAP-Notification) response from the UE 220 and can send an UL NAS transport message indicating attach completion to the NGCN CP functions 242.

At 428, after the successful attachment, the N3IWF 210 can request a PDU session on behalf of the UE 220. For example, the N3IWF 210 can send a PDU session setup request to NGCN CP Functions 242 in order to request a data connection for the UE 220. The parameters, such as APN, PDU type, SCC mode, and other parameters, of this PDU session may not be provided by the N3IWF 210. Instead, at 430 the N3IWF can request a default PDU session using an UL NAS Transport message including a PDU session setup request for the default PDU session. At 432, the CP functions 242 can retrieve the PDU session parameters, such as APN, PDU type, Session & Service Continuity (SSC) mode, and other parameters, from a subscription profile of the UE 220. For example, the UE 220 can be an NGCN subscriber and the subscription data in the subscription profile of the UE 220 can be retrieved from a SDM in a mobile core network.

According to a possible implementation, if a mobile operator wants to allow an existing/legacy IoT/WLAN-only device, such as the UE 220, to connect to a mobile core network, such as a NextGen core network, a subscription for this device can be created in the NextGen core network. This subscription creation may not impact the device. The device may only need to be configured with new authentication credentials. The device can use these credentials when it attempts to establish the IPsec tunnel. According to a possible implementation, only subscribed remote units may access the NGCN. Existing devices may not need any changes apart from being configured with the credentials to use during IPsec establishment with an N3IWF. This may require configuration changes in the device, but not implementation changes. Existing device can access the NGCN by being configured to use certain credentials when they attempt an IPsec tunnel with an N3IWF in a certain PLMN. Nearly all existing devices can be re-configured with new and/or updated credentials.

While establishing the PDU session, at 434, the NGCN CP functions 242 can send a resource setup request to the N3IWF 210. At 436, the N3IWF 210 can then respond to the NGCN CP functions 242 with a resource setup response which contains the N3IWF-specific parameters, such as the IP address and port where the N3IWF expects DL data traffic, for the establishment of a new NG3 data connection. At 438, the NGCN CP functions 242 configures the NGCN UP functions 244 with the appropriate communication parameters so that the NGCN UP functions 244 can subsequently communicate with N3IWF 210 via a new NG3 data connection. After the PDU session is setup and the NG3 user-plane is established (i.e. the new NG3 data connection is established between N3IWF 210 and the UP functions 244), at 440 the N3IWF 210 can send the EAP-Success message to the UE 220 which completes the IPsec tunnel setup procedure. After this point, the UE 220 can then create a new network interface and binds this interface to the IPsec tunnel 442. The N3IWF 210 can use the IPsec tunnel 442 for user-plane communication between the UE 220 and the NGCN UP functions 244 over the NG3 interface. In this case, the N3IWF 210 does not use the IPsec tunnel 442 for control-plane communication between the UE 220 and the NGCN CP functions 242 as in the signaling flow diagram 300. With this procedure, legacy UEs and existing WLAN-only devices can connect to a NGCN, such as when they support the existing IKEv2 procedure with embedded EAP authentication.

Figure 5:
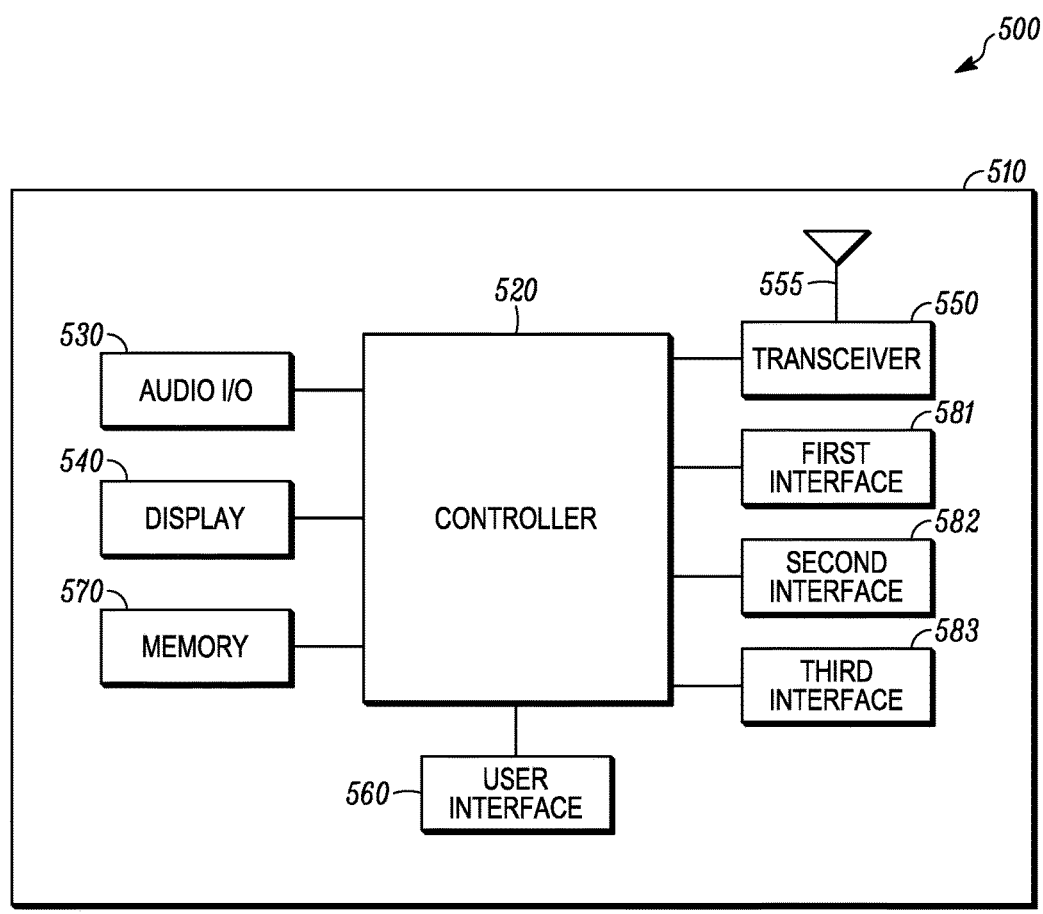
FIG. 5 is an example block diagram of an apparatus according to a possible embodiment.

FIG. 5 is an example block diagram of an apparatus 500, such as the interworking entity 135 and/or the N3IWF 210, according to a possible embodiment. The apparatus 500 can be part of a WLAN, can be part of a core network, can be autonomous, or can be anywhere else that provides access between a remote unit, such as a remote unit 105, and a mobile core network, such as the mobile core network 130. The apparatus 500 can include a housing 510, a controller 520 within the housing 510, audio input and output circuitry 530 coupled to the controller 520, a display 540 coupled to the controller 520, a transceiver 550 coupled to the controller 520, an antenna 555 coupled to the transceiver 550, a user interface 560 coupled to the controller 520, a memory 570 coupled to the controller 520, a first interface 581 coupled to the controller 520, a second interface 582 coupled to the controller 520, and a third interface 583 coupled to the controller 520. In certain embodiments, the apparatus 500 may not include the audio input and output circuitry 530, display 540, user interface 560, transceiver 550, and/or antenna 555. The apparatus 500 can perform the methods described in all the embodiments.

The display 540 can be a viewfinder, a liquid crystal display (LCD), a light emitting diode (LED) display, a plasma display, a projection display, a touch screen, or any other device that displays information. The transceiver 550 can include a transmitter and/or a receiver. The audio input and output circuitry 530 can include a microphone, a speaker, a transducer, or any other audio input and output circuitry. The user interface 560 can include a keypad, a keyboard, buttons, a touch pad, a joystick, a touch screen display, another additional display, or any other device useful for providing an interface between a user and an electronic device. The memory 570 can include a random access memory, a read only memory, an optical memory, a solid state memory, a flash memory, a removable memory, a hard drive, a cache, or any other memory that can be coupled to an apparatus.

The first interface 581 can be a network interface, an NWu interface, and/or any other interface that communicates with a remote unit, such as a remote unit 105, over a non-3GPP access network. A non-3GPP access network can be the WLAN access network 110, the standalone untrusted non-3GPP access network 230, a network that is not specified by 3GPP standards, a Bluetooth network, a WiMax network, a IEEE 1394 network, and/or any other non-3GPP access network that supports IP communication. The second interface 582 can be a network interface, an NG2 interface, a control plane interface, and/or any other interface that communicates with a mobile core network, such as the mobile core network 130. The control plane can also be referred to as signaling. The third interface 583 can be a network interface, an NG3 interface, a user plane interface, and/or any other interface that communicates with a mobile core network. The NG2/NG3 interfaces are defined in 3GPP TR 23.799. According to other implementations, a network interface can be a Universal Serial Bus (USB) port, an Ethernet port, an infrared transmitter/receiver, an IEEE 1394 port, a WLAN transceiver, or any other interface that can connect an apparatus to a network, device, or computer and that can transmit and receive data communication signals.

The apparatus 500 or the controller 520 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 570 or elsewhere on the apparatus 500. The apparatus 500 or the controller 520 may also use hardware to implement disclosed operations. For example, the controller 520 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 520 may be any controller or processor device or devices capable of operating an apparatus and implementing the disclosed embodiments. Some or all of the additional elements of the apparatus 500 can also perform some or all of the operations of the disclosed embodiments.

In operation, the controller 520 can receive a secure connection request to establish a secure connection via the first network interface 581. The secure connection request can be an IKE(EAP-Response/Identity) message or any other request for a secure connection depending on the communication protocol used for the request.

The controller 520 can determine whether the secure connection request is associated with a first capability or a second capability. The first capability can be a Non-Access Stratum (NAS) communication capability of a remote unit that supports NAS signaling. The second capability can be a communication capability of a remote unit that does not support NAS signaling. NAS is a control-plane functional layer operating in a mobile core network and in a remote unit. The NAS layer can be used to manage the establishment of communication sessions and for maintaining continuous communications with the remote unit as it moves. The NAS layer implements a communication protocol (the NAS protocol) which can exchange NAS messages between a remote unit and mobile core nodes, such as a Serving GPRS Support Node, and/or a Mobility Management Entity, and/or a 5G Access and Mobility Function (AMF) that are passed transparently through the access network and intermediate entity such as the N3IWF 210. Examples of NAS messages can include location update or attach messages, authentication messages, service requests and other messages. The first capability and the second capability can also be other communication capabilities, such as secure and not secure capabilities, different communication protocols, and other communication capabilities.

According to a possible implementation, the controller 520 can receive an identity of the remote unit via the first network interface 581. The identity of the remote unit can have an identity format and the controller 520 can determine whether the secure connection request is associated with a first capability or a second capability based on the identity format. The identity format can include a suffix added to a username in the identity, where the suffix added to the username can indicate the secure connection request is associated with the first capability. Alternately, an omission of the suffix can indicate the secure connection request is associated with the second capability.

For example, according to a possible implementation and as described above, the identity presented by a remote unit as part of an EAP authentication procedure can be normally formatted according to a legacy format as a NAI, such as 0<IMSI>@nai.epc.mnc<MNC>.mcc<MCC>0.3 gppnetwork.org This can be based on the format of the identity presented by existing remote units when they attempt to establish an IPsec to an ePDG located at their home PLMN. The '0' before IMSI can be a hint that indicates preference to use EAP-AKA. authentication. According to a different implementation, the remote unit can present a first capability identity format that is formatted in a different way, such as 0<IMSI>.nas@nai.epc.mnc<MNC>.mcc<MCC>0.3 gppnetwork.org In this case, the ".nas" suffix can be added as part of the username which complies with RFC7542 that defines the username as string *("." string). This first capability identity format can indicate to the N3IWF apparatus that the request is associated with the first capability. For example, the identity format can indicate to the N3IWF that the remote unit is not a legacy remote unit but it is a new remote unit that support NAS signaling over WLAN access.

Otherwise, the identity presented by the remote unit can be in a second capability identity format, which can be an NAI identity that is normally formatted according to the legacy format. This second capability identity format can indicate to the apparatus 500 that the request is associated with the second capability. For example, this second capability identity format can indicate to the apparatus 500 that the remote unit does not support NAS.

According to another possible implementation, the controller 520 can receive a remote unit identity message via the first network interface 581. The remote unit identity message can include an identity of the remote unit and the controller 520 can determine whether the secure connection request is associated with a first capability or a second capability based on the presence of a capability information element in the remote unit identity message. For example, instead of using a different format for the remote unit identity, the remote unit can simply add a new information element in the EAP-Response/Identity message that can indicate to the controller 520 that the remote unit supports the NAS protocol. According to a possible implementation, the controller 520 can send a remote unit identity request via the first network interface 581 and the remote unit identity message can be a remote unit identity response to the remote unit identity request.

The controller 520 can establish the secure connection with the remote unit via the first network interface 581. The secure connection can be an Internet Protocol Security (IPsec) connection between the apparatus 500 and the remote unit, such as an IPsec connection between an N3IWF and a UE. For example, the secure connection via the first network interface can be an IPsec tunnel.

When the secure connection request is associated with the first capability, the controller 520 can determine that the secure connection can be used only for signaling data and can relay signaling data between the secure connection and the second network interface 582. The IPsec tunnel can be used for control signaling, such as NAS signaling, when the secure connection request is associated with the first capability. In this case, the controller 520 can assume that any packet received via the IPsec tunnel is a NAS message from the remote unit and can relay this NAS message to the mobile core network, such as an NGCN, via the second network interface 582.

When the secure connection request is associated with the second capability, the controller 520 can establish a data connection via the third network interface 583 on behalf of the remote unit. The controller 520 can also determine that the secure connection can be used only for user data and can relay user data between the secure connection and the data connection over the third network interface 583. The user data may not include NAS signaling. In this case, the controller 520 can establish a data connection that can be an IPsec connection between the apparatus 500 and the remote unit, such as an IPsec tunnel between an N3IWF and a UE. The IPsec tunnel can be used only for data, such user plane data, when the secure connection request is associated with the second capability. In this case, the controller 520 can assume that any packet received via the IPsec tunnel is a user data packet from the remote unit, such as a TCP/IP or UDP/IP packet, and can relay this packet to the NGCN via the third network interface 583.

According to a possible implementation, the controller 520 can establish a data connection via the third network interface 583 on behalf of the remote unit by requesting a protocol data unit session via the second network interface 582 when the secure connection request is associated with the second capability. The controller 520 can requests a protocol data unit session by sending a protocol data unit session request after the remote unit is successfully attached in the mobile core network. The remote unit can be considered successfully attached in the mobile core network when the controller 520 receives an attach accept message via the second network interface 582 and responds with an attach complete message. For example, as shown in the signaling flow diagram 400, the controller 520 can receive an attach accept message from a mobile core network, can respond with an attach complete message, and can send the protocol data unit session setup request on behalf of the remote unit. The two IKE(EAP-Notification) messages can be optional messages. The controller 520 can send an IKE(EAP-Notification) message to the remote unit when it wants to send to remote unit some information included in the attach accept message. When the remote unit however does not support NAS, it may not be necessary to send an IKE(EAP-Notification) message to remote unit. Thus, in some implementations, these two messages may not be used. In an alternative implementation, as discussed above with respect to signaling flow diagram 300, when controller 520 receives an attach accept, it may not send an IKE(EAP-Notification) to remote unit. Instead, it can send an IKE(EAP-Success) to the remote unit, which completes the establishment of the IPsec tunnel and then forward the attach accept message to the remote unit via an established IPsec tunnel. Since the remote unit can support NAS signaling in this implementation, it can process this attach accept message and send an attach complete response via the IPsec tunnel.

The data connection via the third network interface 583, such as an NG3 interface, can be established after sending a protocol data unit session setup request message via the second network interface 582, such as an NG2 interface. The controller 520 can request protocol data unit session by a sending a protocol data unit session setup request message via the second network interface 582. The protocol data unit session setup request message can include an indication that indicates that default parameters should be used for the requested protocol data unit session. The default parameters can be derived from or associated with the subscription data of the remote unit. The controller 520 can receive a resource setup request via the second network 582 interface in response to requesting the protocol data unit session. The resource setup request can trigger the controller 520 to send a success message to the remote unit indicating that the secure connection is successfully established. The success message can be an internet key exchange extensible authentication protocol success message. The resource setup request can be a message that instructs the controller 520 to set up communication resources with the remote unit. These resources can be used to support the data communication for the requested protocol data unit session. This message can trigger the controller 520 to complete an IPsec establishment for the secure connection.

Figure 6:
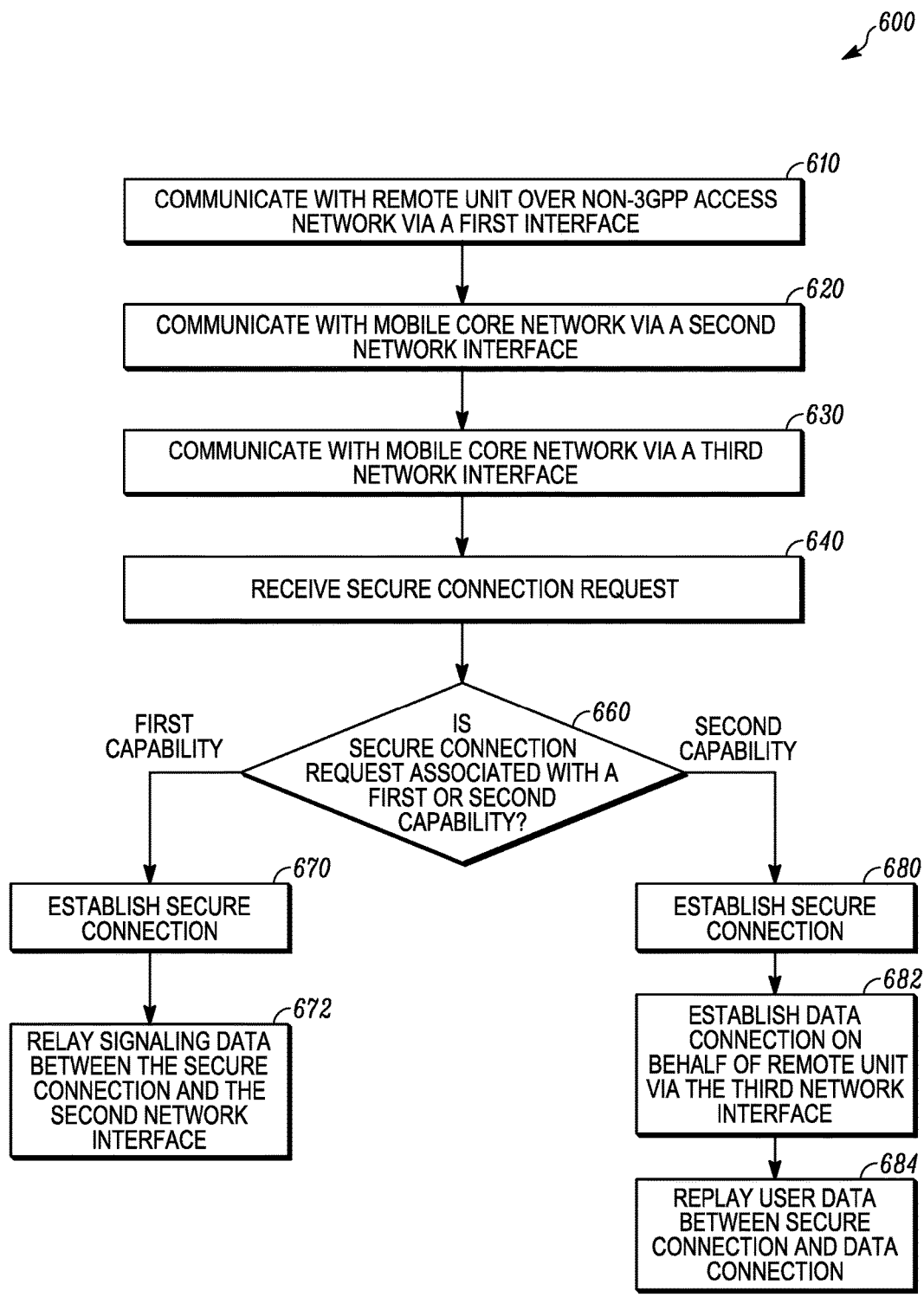
FIG. 6 is an example flowchart illustrating the operation of an apparatus according to a possible embodiment.

FIG. 6 is an example flowchart 600 illustrating the operation of an apparatus, such as the interworking entity 130, the N3IWF 210, and/or the apparatus 500, according to a possible embodiment. At 610, a remote unit can be communicated with over a non-3GPP access network via a first network interface. At 620, a mobile core network can be communicated with via a second network interface. At 630, the mobile core network can be communicated with via a third network interface. At 640, a secure connection request to establish a secure connection can be received via the first network interface.

At 660, the secure connection request can be determined to be associated with a first capability or a second capability. The secure connection request can be determined to be associated with the first capability or the second capability based on an identity format of an identity of the remote unit. The secure connection request can also be determined to be associated with a first capability or a second capability based on the presence of a capability information element in a remote unit identity message. For example, the mere presence of the capability information element can indicate the secure connection request is associated with the first capability. As an alternate, a value of the capability information element can indicate whether the secure connection request is associated with the first capability or the second capability.

If the secure connection request is associated with the first capability, at 670, the secure connection can be established and can be used to transfer only signaling data with the remote unit via the first network interface. At 672, signaling data can be relayed between the secure connection and the second network interface. According to a possible implementation, the secure connection can only be used to transfer signaling data when the secure connection is associated with the first capability.

If the secure connection request is associated with the second capability, at 680, the secure connection can be established and can be used to transfer only user data with the remote unit via the first network interface. At 682, a data connection can be established via the third network interface on behalf of the remote unit. Establishing a data connection can include requesting a protocol data unit session via the second network interface. The protocol data unit session can be requested by sending a protocol data unit session request after the remote unit is successfully attached to the mobile core network. Establishing a data connection can also include receiving a resource setup request via the second network interface in response to requesting the protocol data unit session. The resource setup request can trigger the sending of a success message to the remote unit indicating that the secure connection is successfully established. At 684, user data can be relayed between the secure connection and the data connection when the secure connection request is associated with the second capability.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. For example, the flowchart 600 can incorporate operations of the signaling flow diagram 300, operations of the signaling flow diagram 400, and/or operations of the apparatus 500. Also, some of the steps performed can be repeated on an ongoing or continuous basis simultaneously while other steps are performed. Furthermore, different steps can be performed by different elements or in a single element of the disclosed embodiments.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

I claim:

1. An apparatus comprising:
   a first network interface that communicates with a remote unit over a non-3GPP access network;
   a second network interface that communicates with a mobile core network;
   a third network interface that communicates with the mobile core network;

a controller that:
  receives a secure connection request to establish a secure connection via the first network interface,
  determines whether the secure connection request is associated with a first capability or a second capability,
  establishes the secure connection with the remote unit via the first network interface,
  relays signaling data between the secure connection and the second network interface when the secure connection request is associated with the first capability, and
  establishes a data connection via the third network interface on behalf of the remote unit and relays user data between the secure connection and the data connection over the third network interface when the secure connection request is associated with the second capability,
  wherein the first capability supports non-access stratum communication and the second capability does not support non-access stratum communication.

2. The apparatus according to claim 1, wherein the controller establishes a data connection via the third network interface on behalf of the remote unit by requesting a protocol data unit session via the second network interface.

3. The apparatus according to claim 2, wherein the controller requests protocol data unit session by a sending a protocol data unit session setup request message via the second network interface, where the protocol data unit session setup request message includes an indication that indicates that default parameters should be used for the requested protocol data unit session.

4. The apparatus according to claim 2, wherein the controller receives a resource setup request via the second network interface in response to requesting the protocol data unit session, where the resource setup request triggers the controller to send a success message to the remote unit indicating that the secure connection is successfully established.

5. The apparatus according to claim 2, wherein the controller requests a protocol data unit session by sending a protocol data unit protocol data unit session request after the remote unit is successfully attached in the mobile core network.

6. The apparatus according to claim 1,
  wherein the controller receives an identity of the remote unit via the first network interface, where the identity of the remote unit has an identity format, and
  wherein the controller determines whether the secure connection request is associated with a first capability or a second capability based on the identity format.

7. The apparatus according to claim 6, wherein an identity format includes a suffix added to a username in the identity, where the suffix added to the username indicates the secure connection request is associated with the first capability.

8. The apparatus according to claim 7, wherein an omission of the suffix indicates the secure connection request is associated with the second capability.

9. The apparatus according to claim 1,
  wherein the controller receives a remote unit identity message via the first network interface, the remote unity identity message including an identity of the remote unit, and
  wherein the controller determines whether the secure connection request is associated with a first capability or a second capability based on the presence of a capability information element in the remote unit identity message.

10. The apparatus according to claim 1, wherein the non-3GPP access network is a wireless local area network containing at least one wireless local area network access point.

11. The apparatus according to claim 1,
  wherein second network interface exchanges control plane data with the mobile core network, and
  wherein the third network interface exchanges user plane data with the mobile core network.

12. The apparatus according to claim 1, wherein the secure connection is only used to transfer signaling data when the secure connection is associated with the first capability.

13. The apparatus according to claim 1, wherein the secure connection is only used to transfer user data when the secure connection is associated with the second capability.

14. A method comprising:
  communicating with a remote unit over a non-3GPP access network via a first network interface;
  communicating with a mobile core network via a second network interface;
  communicating with the mobile core network via a third network interface;
  receiving a secure connection request to establish a secure connection via the first network interface;
  determining whether the secure connection request is associated with a first capability or a second capability;
  establishing the secure connection with the remote unit via the first network interface;
  relaying signaling data between the secure connection and the second network interface if the secure connection request is associated with the first capability; and
  establishing a data connection via the third network interface on behalf of the remote unit and relaying user data between the secure connection and the data connection if the secure connection request is associated with the second capability,
  wherein the first capability supports non-access stratum communication and the second capability does not support non-access stratum communication.

15. The method according to claim 14, wherein establishing a data connection comprises requesting a protocol data unit session via the second network interface.

16. The method according to claim 15, wherein establishing a data connection comprises receiving a resource setup request via the second network interface in response to requesting the protocol data unit session, where the resource setup request triggers the sending of send a success message to the remote unit indicating that the secure connection is successfully established.

17. The method according to claim 15, wherein the protocol data unit session is requested by sending a protocol data unit protocol data unit session request after the remote unit is successfully attached in the mobile core network.

18. The method according to claim 14, further comprising receiving an identity of the remote unit via the first network interface, where the identity of the remote unit has an identity format,
  wherein determining comprises determining whether the secure connection request is associated with a first capability or a second capability based on the identity format.

19. The method according to claim 14, further comprising receiving a remote unit identity message via the first network interface, the remote unity identity message including an identity of the remote unit, wherein determining comprises determining whether the secure connection request is associated with a first capability or a second capability based on the presence of a capability information element in the remote unit identity message.

* * * * *